(12) United States Patent
Bittner

(10) Patent No.: US 11,272,700 B2
(45) Date of Patent: Mar. 15, 2022

(54) AGRICULTURAL VEHICLE HAVING AN APPLICATION BOOM WITH IMPROVED CORD MEMBER STRUCTURE

(71) Applicant: CNH Industrial America LLC, New Holland, PA (US)

(72) Inventor: Roy A. Bittner, Cato, WI (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/546,796

(22) Filed: Aug. 21, 2019

(65) Prior Publication Data
US 2021/0051939 A1 Feb. 25, 2021

(51) Int. Cl.
| | |
|---|---|
| B05B 15/62 | (2018.01) |
| B05B 1/20 | (2006.01) |
| A01M 7/00 | (2006.01) |
| A01C 23/04 | (2006.01) |
| A01M 21/04 | (2006.01) |

(52) U.S. Cl.
CPC ......... *A01M 7/0075* (2013.01); *A01C 23/047* (2013.01); *A01M 21/043* (2013.01); *B05B 1/20* (2013.01); *B05B 15/62* (2018.02)

(58) Field of Classification Search
CPC . A01M 7/0075; A01M 21/043; A01C 23/047; B05B 1/20; B05B 15/14; B05B 15/18; B05B 15/62
See application file for complete search history.

(56) References Cited

U.S. PATENT DOCUMENTS

| | | | | |
|---|---|---|---|---|
| 4,711,398 A | * | 12/1987 | Ganderton | .......... A01M 7/0071 239/167 |
| 5,971,295 A | | 10/1999 | Jensen et al. | |
| 6,842,119 B2 | * | 1/2005 | Nurse | .................. B66C 23/905 212/348 |
| 8,746,589 B2 | | 6/2014 | Barker et al. | |

(Continued)

FOREIGN PATENT DOCUMENTS

| | | |
|---|---|---|
| CN | 1530185 A | 9/2004 |
| CN | 204312880 U | 5/2015 |

(Continued)

OTHER PUBLICATIONS

Millennium Aluminum Spray Boom; Specialty Enterprises, LLC; https://specialtyllc.net/Millennium/—(7) pages.

*Primary Examiner* — Darren W Gorman
(74) *Attorney, Agent, or Firm* — Rebecca L. Henkel; Rickard K. DeMille

(57) ABSTRACT

An agricultural vehicle includes a chassis, wheels supporting the chassis for moving the vehicle, and an application system supported by the chassis and including a product tank storing a volume of agricultural product for delivery onto an agricultural field. The agricultural vehicle further includes an application boom configured to deliver the agricultural product to the agricultural field. The application boom includes a boom arm segment having a primary longitudinal composite tube for axial torsion support, and an elongated non-composite member coupled to the primary longitudinal composite tube for buckling support. The boom arm segment can further include a truss system, and the primary longitudinal composite tube can be a lower cord of the truss system.

10 Claims, 7 Drawing Sheets

(56) References Cited

U.S. PATENT DOCUMENTS

| | | |
|---|---|---|
| 9,807,997 B2 | 11/2017 | Hiddema et al. |
| 10,010,026 B2 | 7/2018 | Honermann et al. |
| 2005/0011604 A1 | 1/2005 | Anderson et al. |
| 2017/0000103 A1 | 1/2017 | Wissler et al. |
| 2019/0357519 A1* | 11/2019 | Castro .................... B05B 15/62 |

FOREIGN PATENT DOCUMENTS

| | | |
|---|---|---|
| EP | 1468605 A1 | 10/2004 |
| WO | 2013092272 A1 | 6/2013 |

* cited by examiner

AGRICULTURAL VEHICLE HAVING AN APPLICATION BOOM WITH IMPROVED CORD MEMBER STRUCTURE

FIELD OF THE INVENTION

The invention relates generally to agricultural machines having agricultural product application equipment and, in particular, to an agricultural vehicle including an application boom utilizing an improved cord member structure.

BACKGROUND OF THE INVENTION

Various types of agricultural vehicles (e.g., sprayers, floaters, applicators, collectively referred to herein as applicators) are employed to deliver fertilizer, pesticides, herbicides, or other products to the surface of a field. Such agricultural vehicles typically include an application boom configured to facilitate product delivery over wide swaths of soil. As will be appreciated, longer booms cover wider swaths of soil.

Most application boom designs utilize only steel to handle the structural loads of a given boom. As application booms get longer over time, alternate structural materials to steel become more attractive, due to the altering relationships between cost, weight, and stress characteristics. Composite materials like carbon fiber tubes can carry distributed loads well, but are often challenged by 1) the damage done by otherwise minor collisions, 2) buckling under column loading, and 3) the cost of hand joining carbon fiber components together.

SUMMARY OF THE INVENTION

One of the most affordable methods of producing a carbon fiber (CF) member is a "wrapped on a mandrel" method. A CF member is typically strong in axial torsion, but is vulnerable to buckling if put under a bending load, or if it suffers an impact (e.g., hitting an object). One of the most affordable methods of producing a metal (such as aluminum) element is the extrusion method. Depending on the shape, it can be made to handle impacts and bending. According to some aspects of the invention, bonding the CF element with an aluminum extrusion can result in the assembly being stronger than the sum of the parts.

As an example, a boom with a carbon fiber primary section may have an aluminum overlay. With this construction, the loading of the primary section is handled by the carbon fiber and the stress the overlay sees is, by design, handled by the aluminum. With bonding the aluminum to the carbon fiber, both elements take the load together to address the weaknesses of both materials, augment the strengths of both materials, and reduce the manufacturing cost.

According to one aspect of the invention, an agricultural vehicle includes a chassis, wheels supporting the chassis for moving the vehicle, and an application system supported by the chassis and including a product tank storing a volume of agricultural product for delivery onto an agricultural field. The agricultural vehicle further includes an application boom configured to deliver the agricultural product to the agricultural field. The application boom includes a boom arm segment having a primary longitudinal composite tube for axial torsion support, and an elongated non-composite member coupled to the primary longitudinal composite tube for buckling support. The boom arm segment can further include a truss system, and the primary longitudinal composite tube can be a lower cord of the truss system.

According to another aspect of the invention, the primary longitudinal composite can include carbon fiber material and the primary longitudinal tube can be a carbon fiber tube. The elongated non-composite member can be bonded to the primary longitudinal composite tube, and the elongated non-composite member can be a metal extrusion.

According to yet another aspect of the invention, the elongated non-composite member is contiguous with a bonding sheet and the bonding sheet is contiguous with the primary longitudinal composite tube.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

DESCRIPTION OF THE FIGURES

Preferred exemplary embodiments of the invention are illustrated in the accompanying drawings in which like reference numerals represent like parts throughout.

DETAILED DESCRIPTION

Figure 1:
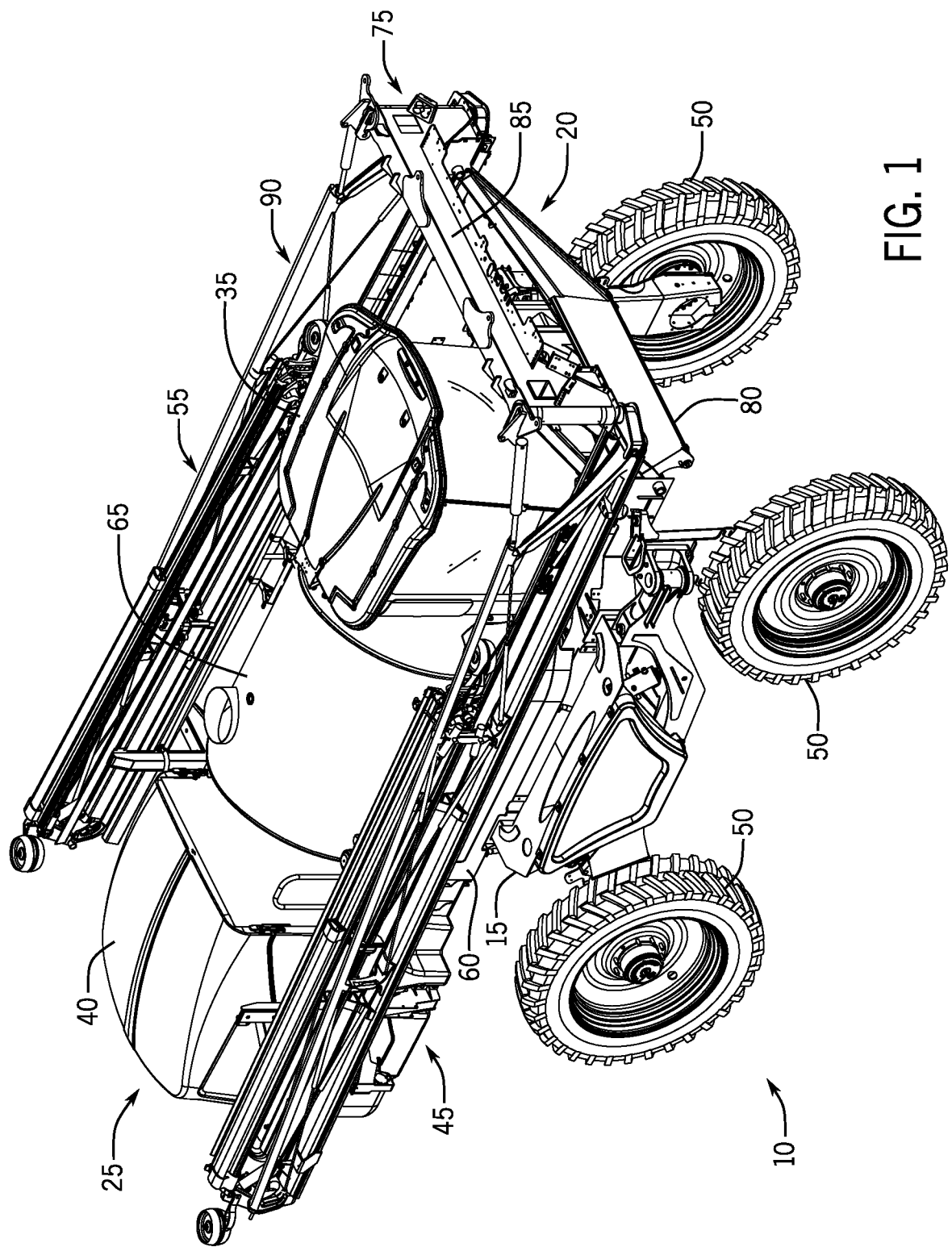
FIG. 1 is an isometric view of a front-boom sprayer from a first perspective, where the boom is in a raised position, and a left boom arm is in a retracted position.

Referring now to the drawings and specifically to FIGS. 1-4, aspects of the invention are shown for use with an agricultural vehicle, which is shown in the figures to be an agricultural sprayer vehicle (referred to herein as simply "sprayer") 10. The sprayer 10 is shown as a front-boom sprayer, such as those available from CNH Industrial, including the Miller Nitro sprayers and New Holland Guardian Series sprayers. Other arrangements for the sprayer 10 are contemplated, including a rear-mounted configuration boom sprayer, such as those available from CNH Industrial, including the Miller Condor Series sprayers and New Holland Guardian Series rear-boom sprayers. Moreover, other agriculture machines and vehicles incorporating aspects of the invention are contemplated, including agriculture vehicles having a boom.

The sprayer 10 includes a frame or chassis 15 having front and back ends 20 and 25, respectively. The chassis 15 provides structural support for various assemblies, systems, and components of the sprayer 10. These various assemblies, systems, and components can include an operator cab 35 in a forward position toward the front end 20 of the chassis 15. An engine 40 and a hydraulic system 45 are shown in a rearward position toward the back end 25 of the chassis 15. The hydraulic system 45 receives power from the engine 40 and includes at least one hydraulic pump which can be in a hydrostat arrangement. The hydraulic pump(s) provide hydraulic pressure for operating hydraulic components within the hydraulic system 45. For sprayers with hydrostatic drives, hydraulic motors are operably connected to the hydraulic pump(s) for rotating wheels 50 of the sprayer 10. In mechanical drive applications, a mechanical transmission receives power from the engine 40 and delivers power for rotating the wheels 50 by way of power-transmitting driveline components. Example power-transmitting driveline components include drive shafts, differentials, and other gear sets in portal, drop boxes, or other housings.

A spray-application system 55 is supported by the chassis 15. The spray-application system 55 includes storage containers, such as a rinse tank 60 for storing water or a rinsing solution and a product tank 65 for storing a volume of product for delivery onto an agricultural field with the sprayer 10. The product includes any of a variety of agricultural liquid products, such as various pesticides, herbicides, fungicides, liquid fertilizers, and other liquids including liquid suspensions beneficial for application onto agricultural fields. A product delivery pump can convey product from the product tank 65 through plumbing components (e.g., interconnected pieces of tubing) and through a boom tubing system. The boom tubing system releases the product out of spray nozzles that are spaced from each other along the width of an application boom (simply referred to as boom 75 herein) during spraying operations of the sprayer 10. Groups or banks of multiple adjacent spray nozzles define multiple spray segments of the spray system. Spray segments are defined along the boom 75 and selectively deliver product for release onto an agricultural field at locations corresponding to positions of activated spray segments.

Figure 2:
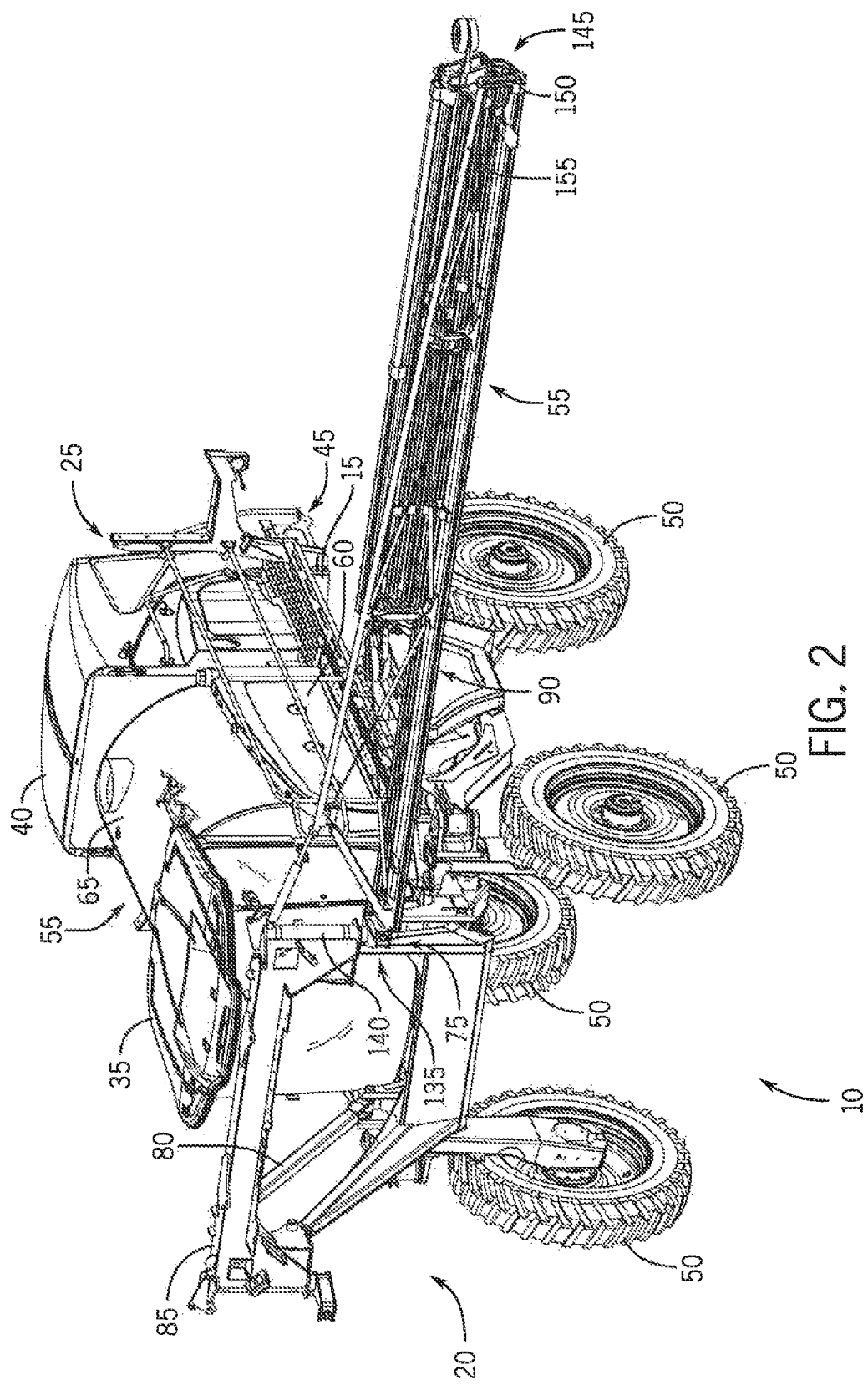
FIG. 2 is an isometric view from a second perspective of the front-boom sprayer of FIG. 1, where the boom is in a raised position, the right boom arm is removed, a first boom arm segment of the left boom arm is in an extended positioned, and second and third boom arm segments of the left boom arm are in the retracted position.

The boom 75 is connected to the chassis 15 with a lift arm arrangement or assembly 80. The lift arm assembly 80 is attached to a boom center section 85. The lift arm assembly 80 is configured to move the boom 75 up and down for adjusting the height of application of the product and/or to raise the boom 75 above objects (e.g., agricultural product). FIGS. 1 and 2 show the boom in a raised position, and FIGS. 3 and 4 show the boom in a lowered position.

Coupled to the boom center section 85, the boom 75 has multiple interconnected segments that collectively define each of a left and right boom arm, respectively. Left and right for the boom 75 are defined with respect to an operator's view of the boom 75 from the operator cab 35. Left and right boom arms extend in opposite directions from the boom center section 85. The left and right boom arms are mirror identical about a longitudinal axis of the sprayer 10, and thus, only left boom arm 90 is shown and described in further detail. For simplicity, FIGS. 1-4 show the right boom arm removed. FIG. 1 shows the left boom arm 90 in a retracted, or transport, position. FIGS. 2-4 show the left boom arm 90 in an extended position.

The left boom arm 90 has multiple segments, including first, second, and third boom arm segments 100, 105, and 110 (FIG. 4), respectively. The number of boom arm segments can vary among sprayer designs. Collectively, the boom center section 85, the left boom arm 90, and the right boom arm define the boom 75, which has left and right ends, respectively. The boom 75 has an inner facing side 125 that faces toward the operator cab 35 and provides a vehicle mounting surface(s) with mounting structures configured for mounting the boom 75 to the lift arm assembly 80. Opposite the inner facing side 125 is an outer facing or outward side 130 of the boom 75 that faces away from the operator cab 35.

Figure 3:
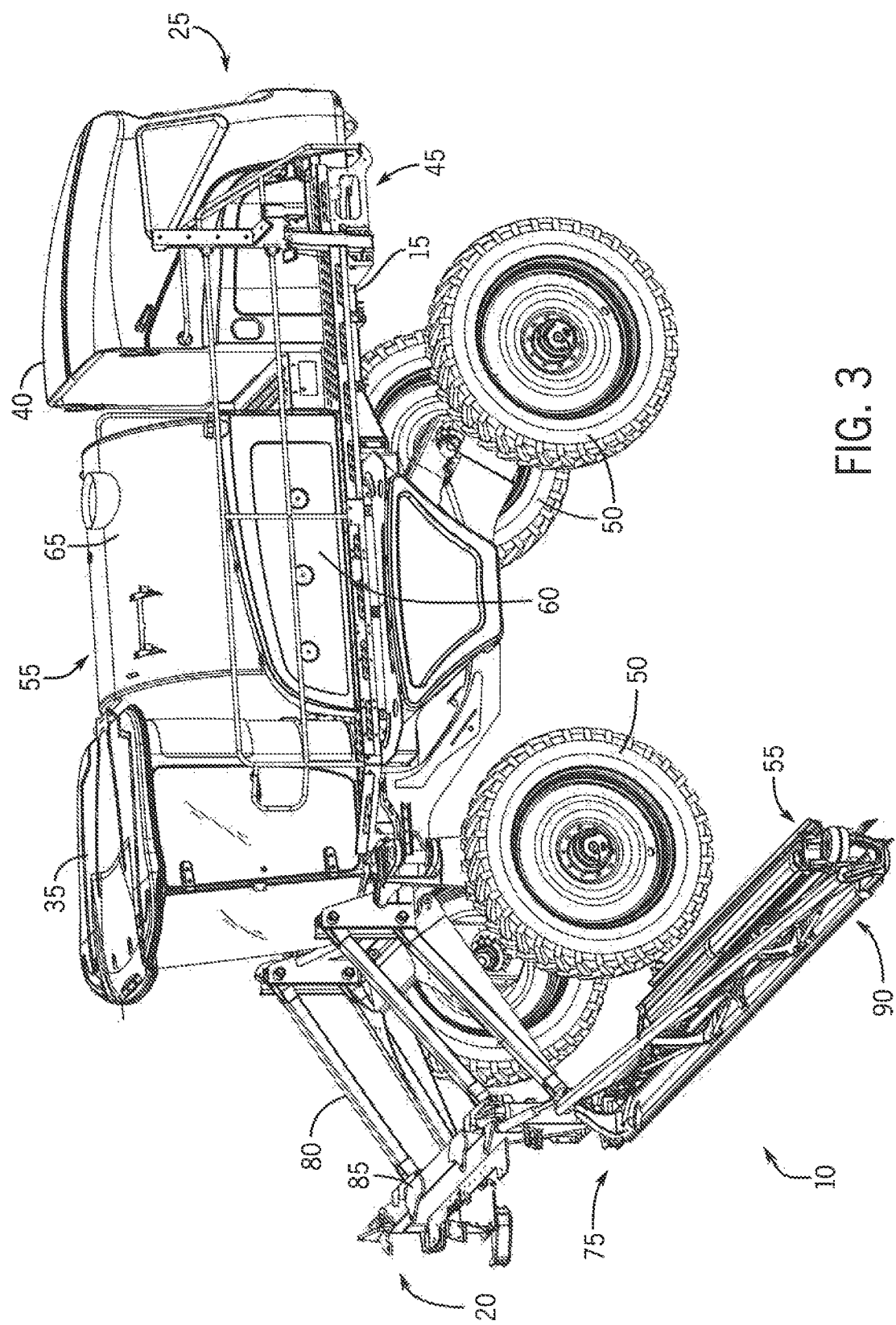
FIG. 3 is an isometric view from the second perspective of the front-boom sprayer of FIG. 1, where the boom is in a lowered position, the right boom arm is removed, the first boom arm segment of the left boom arm is in the extended positioned, and the second and third boom arm segments of the left boom arm are in the retracted position.
Figure 4:
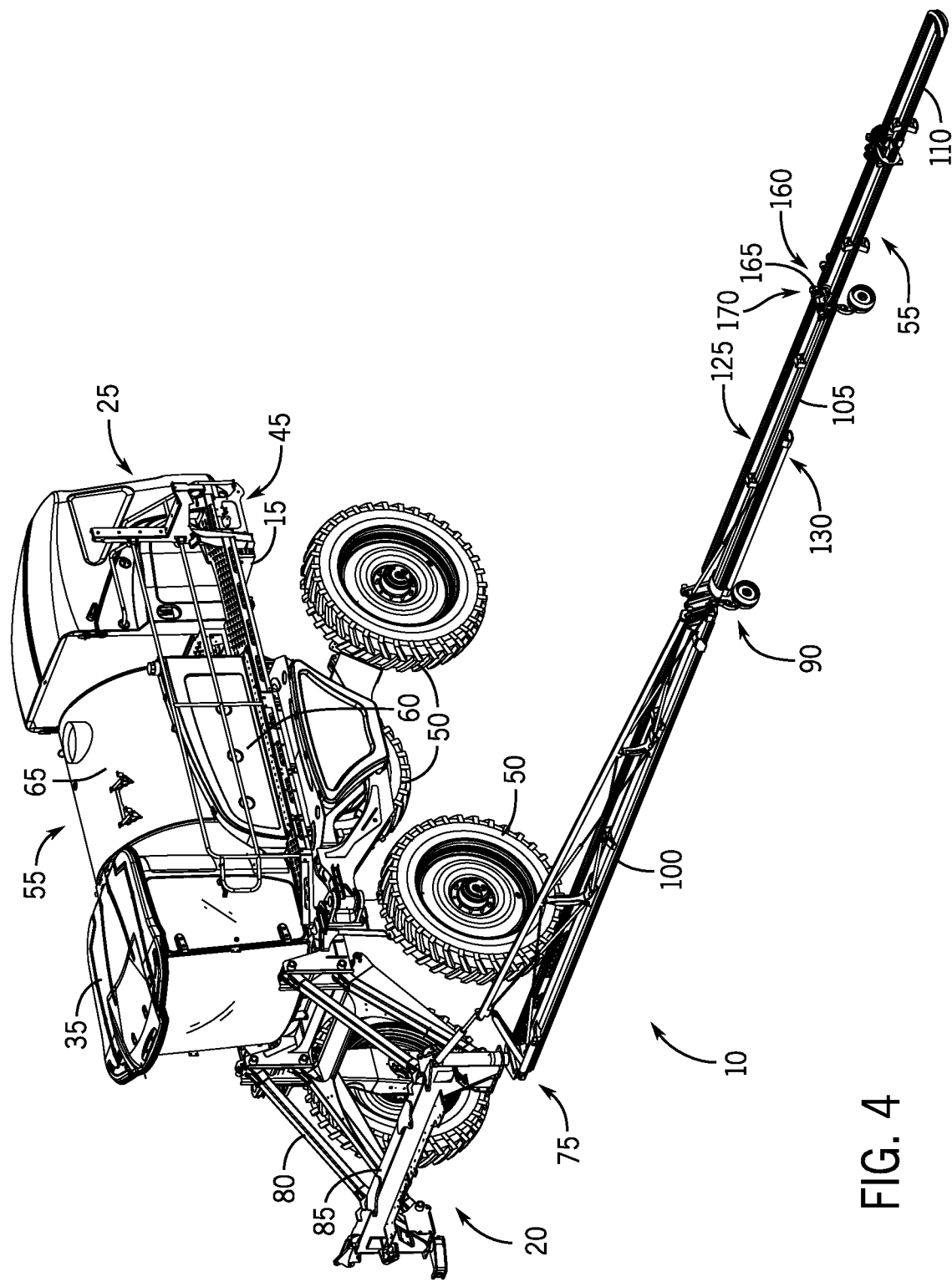
FIG. 4 is an isometric view from the second perspective of the front-boom sprayer of FIG. 1, where the boom is in the lowered position, the right boom arm is removed, and the left boom arm is in a fully extended position.

FIGS. 2 and 3 show the left boom arm 90 in a first extended, spray position, where only the first segment 100 of the left boom arm 90 is extended. Moreover, FIG. 2 shows the left boom arm 90 at a first spray height and FIG. 3 shows the left boom arm at a second spray height. FIG. 4 shows the left boom arm in a second extended, spray position, where all of the first, second, and third segments 100-110 are extended. The boom center segment and/or the first, second, and third boom arm segments 100-110 are configured with actuators to allow the left boom arm 90 to fold and extend as necessary for operation.

With reference to FIG. 2, the first boom arm segment 100 has an inner end 135 that is connected with hinge 140 to the boom center section 85. The hinge 140 is configured to allow for generally forward/rearward horizontal pivoting of the first boom arm segment 100, and consequently second and third boom arm segments 105 and 110, away/toward the chassis 15 when pivoting the first boom arm segment 100.

The second boom arm segment 105 has an inner end 145 that is connected with hinge 150 to the outer end 155 of the first boom arm segment 100. The hinge 150 is configured to allow for generally rotating the second boom arm segment 105, and consequently third boom arm segment 110, away/toward the first boom arm segment 100 when pivoting the second boom arm segment 105.

With reference to FIG. 4, the third boom arm segment 110 has an inner end 160 that is connected with hinge 165 to the outer end 170 of the second boom arm segment 105. The hinge 165 is configured to allow for rotational pivoting of the third boom arm segment 110 away/toward the second boom arm segment 105 when pivoting the third boom arm segment 110.

Figure 5:
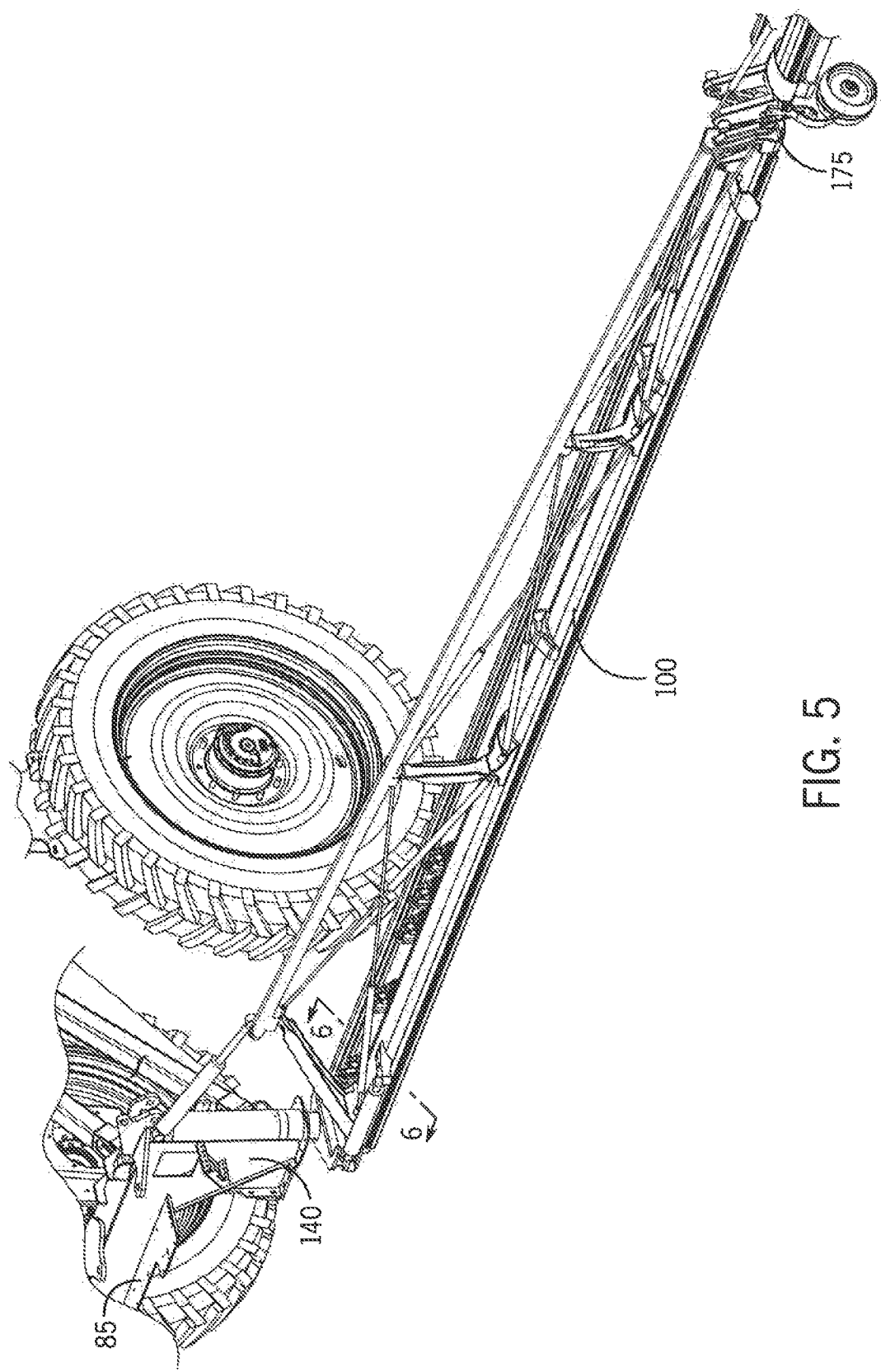
FIG. 5 is an enlarged isometric view of a portion of the left boom arm of FIG. 4 according to some aspects of the present invention.

FIG. 5 is an enlarged view of the first boom arm segment 100 coupled with the boom center section 85 via the hinge 140. The first boom arm segment 100 has a truss arrangement. Included with the truss arrangement is a longitudinal tube 175, which may also be referred to as a cord or lower cord. The longitudinal tube 175 is one example of a cord in the truss arrangement. FIG. 4 shows the left boom arm having multiple longitudinal tubes. Aspects of the invention are discussed in connection with the longitudinal tube 175, but can be used in many other tube arrangements.

Figure 6:
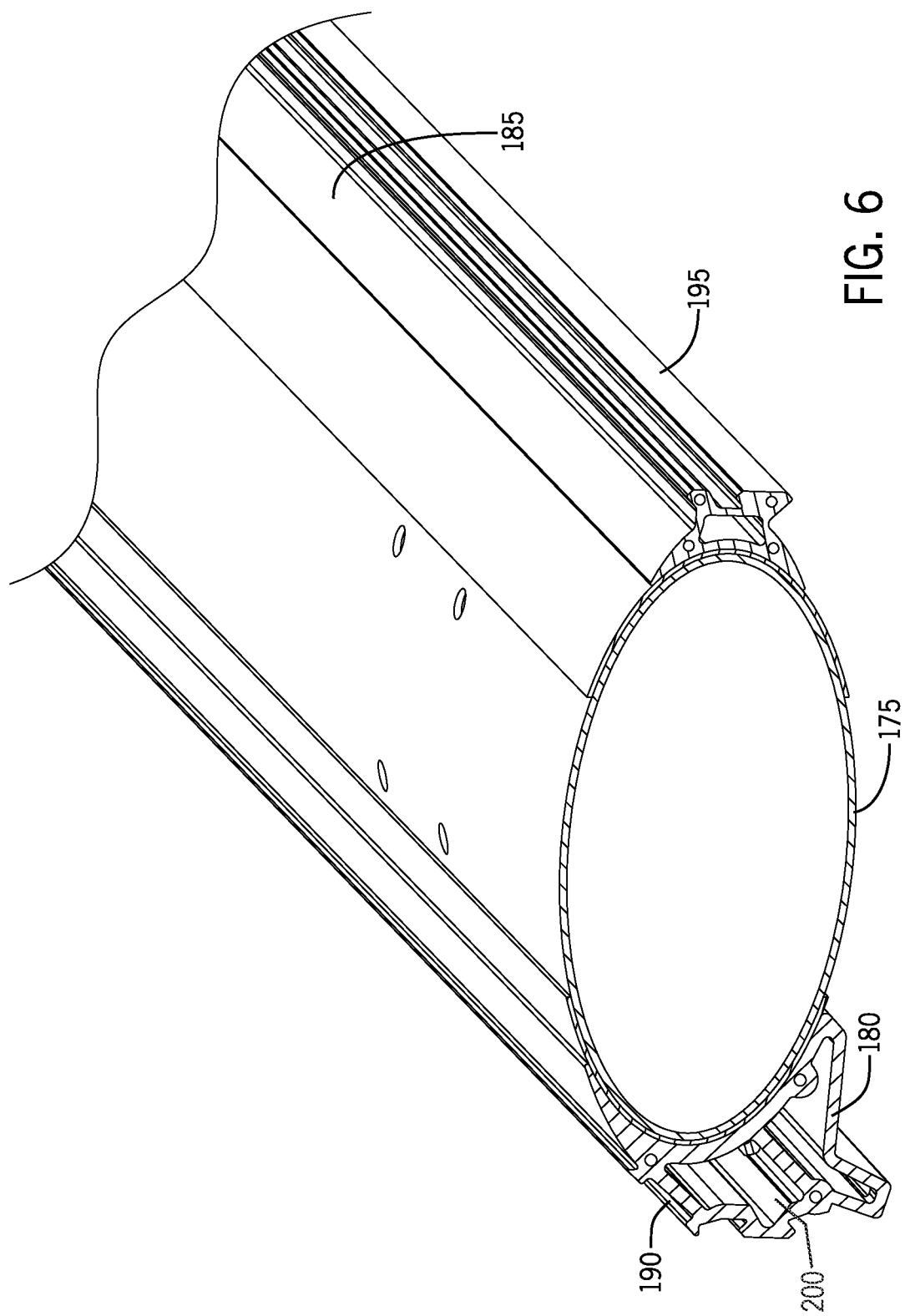
FIG. 6 is a cross-sectional view of a portion of the left boom arm of FIG. 5 along line 6-6'.

FIG. 6 shows a cross-sectional view of a portion of the longitudinal tube 175 in FIG. 5. More specifically, FIG. 6 shows the longitudinal tube 175 coupled to first and second extrusions 180 and 185, respectively. As application booms get larger, alternate structural materials to metal (e.g., steel) become more attractive, due to the altering relationships between costs, weight, and stress characteristics. Composite materials like carbon fiber (CF), fiberglass, ceramic matrix composites, etc. can carry distributed loads well. The shown longitudinal tube 175 is a composite material such as CF.

Also as shown in FIG. 6, the longitudinal tube 175 has an elliptical or oblong cross section, but can have a circular cross section.

The first and second extrusions 180 and 185 can comprise of a different material from the CF tube 175. For example, the first and second extrusions 180 and 185 can consist of extruded aluminum, but other materials are possible. The following benefits can occur by adding bonded aluminum strips.

Protect against damage from collisions or light impacts.
Reinforce CF tubes in areas of compressive loads (control buckling of thin walls).
Provide mounting points for attachments (reduce stress risers from unnecessary holes).
Shaped to control air flow (or not produce turbulence.

The shown first and second extrusions 180 and 185 include rails 190 and 195 for clipping spray nozzles or other apparatus to the application boom 75. In the construction shown, the first extrusion 180 includes a chamber 200 for chasing electrical and hydraulic lines to the spray nozzles. The first and second extrusions 180 and 185 can comprise of a different material from the CF longitudinal tube 175. For example, the first and second extrusions 180 and 185 can consist of extruded aluminum, but other materials are possible including other metals, polymers, ceramics, etc. The first and second extrusions 180 and 185 can also be members made from other manufacturing techniques than extrusion processing. The first extrusion 180 is on the inner facing side 125 (FIG. 4) of the boom 75, and the second extrusion 185 is on the outer facing side 130 of the boom 75. The first and second extrusions 180 and 185 protect the CF longitudinal tube 175 from otherwise minor collisions.

Stress and strain (e.g., deflection) are inevitable in any boom design. Three example contributors to stress and strain are as follows.

Stress in an application boom is generated by the boom's inertia, resisted by the boom's restraints. Rotational inertia is a function of both the mass of an object, and its distance to the axis of rotation.
Joint designs that are multi-axially rigid and restrain tolerable deflections for little or no reason.
Element bonding methods (like welding) that generate stress concentration rather than dispersing stress concentration.

Agricultural machine designers are often tempted to simply add material in areas of high stress. But adding material also adds mass, and therefore increases inertia, which in turn causes more stress, creating a stress-mass cycle. Typical example design criteria to mitigate stress in an application boom include the following.

Choose the material of each element individually, based on the loading, with goal of reducing the inertia of the entire system.
Choose joint designs (and shapes) based on dispersion of the stress from it's particular loading, but allowing tolerable deflections in the other axis.
Choose bonding methods that distribute loads over large areas rather than in point or line contacts like welding does.

The selection of the CF longitudinal tube 175, the first and second extrusions 180 and 185, and the bonding of the first and second extrusions 180 and 185 to the CF longitudinal tube 175 help reduce stress and strain on the boom 75.

Figure 7:
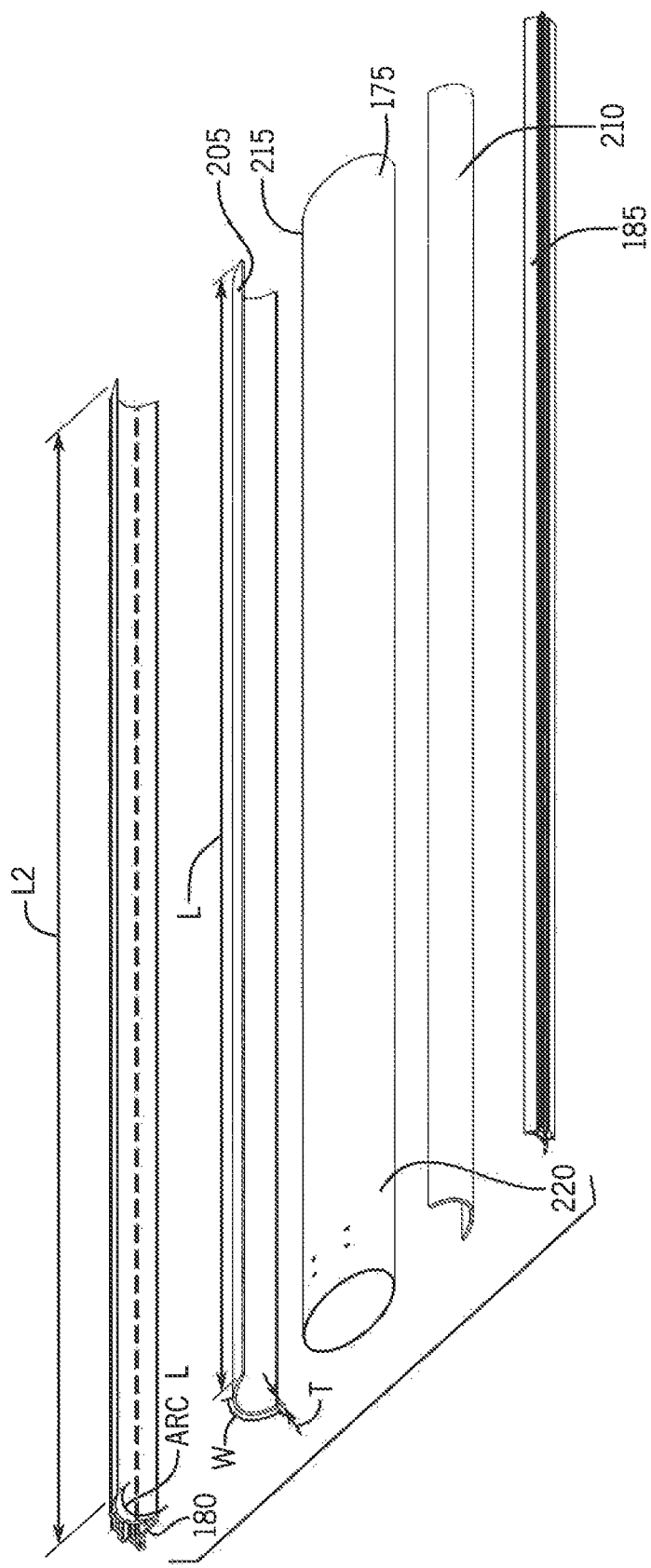
FIG. 7 is an exploded, assembly view of a portion of the left boom arm of FIG. 5.

FIGS. 6 and 7 show a bonding material coupling first and second extrusions 180 and 185 to the longitudinal tube 175. The bonding material is shown in the construction as first and second bonding sheets 205 and 210, respectively. The bonding sheet 205 has a width W equal to or less than the arc length ArcL of the first extrusion 180. The first bonding sheet 205 has a length L1 equal to or less than the length L2 of the first extrusion 180. Moreover, while the first and second extrusions 180 and 185 are bonded to the longitudinal tube 175, other techniques for fastening are possible.

FIG. 7 is an exploded view of a portion of the first boom arm segment 100. During the manufacturing process, the first bonding sheet 205 is applied at a first location 215 on a first lateral side of the longitudinal tube 175, and the second bonding sheet 210 is placed at a second location 220 on a second lateral side of the longitudinal tube 175. The first extrusion 180 is then disposed onto the first bonding sheet 205, and the second extrusion 185 is then disposed onto the second bonding sheet 210. The first and second bonding sheets 205 and 210 are then allowed to cure affixing the first and second extrusions 180 and 185 to the longitudinal tube 175. Fasteners can be used to help hold the assembly in place while the first and second elastomeric sheets 205 and 210 cure. Once the adhesive layer cures, the assembly can then be used as part of the first boom arm segment 100.

Accordingly, one or more aspects of the invention provide an application boom design with a carbon fiber tube and an aluminum extrusion. The CF tube carries distributed loads well, but can be challenged by the damage done by otherwise minor collisions, and buckling under column loading. The aluminum extrusion addresses the issues of the minor collisions and buckling under column loading. The result is that the bonded element both take the load together, addresses the weaknesses of both materials, augments their strengths, and reduces manufacturing costs.

Although the best mode contemplated by the inventors of carrying out the present invention is disclosed above, practice of the above invention is not limited thereto. It will be manifest that various additions, modifications, and rearrangements of the features of the present invention may be made without deviating from the spirit and the scope of the underlying inventive concept.

What is claimed is:

1. An agricultural vehicle comprising:
a chassis;
wheels supporting the chassis for moving the vehicle;
an application system supported by the chassis and including a product tank storing a volume of agricultural product for delivery onto an agricultural field;
an application boom configured to deliver the agricultural product to the agricultural field, the application boom including a boom arm segment comprising:
a primary longitudinal composite tube for axial torsion support, the primary longitudinal composite tube having an elliptical cross-sectional shape and defining an outer perimeter, the outer perimeter of the primary longitudinal composite tube including a first side and a second side opposite the first side; and
first and second elongated non-composite members coupled to the primary longitudinal composite tube for buckling support, the first elongated non-composite member being coupled to the primary longitudinal composite tube along the first side of the outer perimeter of the primary longitudinal composite tube and the second elongated non-composite member being coupled to the primary longitudinal composite tube along the second side of the outer perimeter of the primary longitudinal composite tube, the first elongated non-composite member being a separate component of the boom arm segment from the second elongated non-composite member and being spaced apart from the second elongated non-composite member around the outer perimeter of the primary longitudinal composite tube.

2. The agricultural vehicle of claim 1, wherein the primary longitudinal composite tube is a carbon fiber tube.

3. The agricultural vehicle of claim 1, wherein the first elongated non-composite member is bonded to the primary longitudinal composite tube along the first side of the outer perimeter of the primary longitudinal composite tube and the second elongated non-composite member is bonded to the primary longitudinal composite tube along the second side of the outer perimeter of the primary longitudinal composite tube.

4. The agricultural vehicle of claim 3, wherein the first and second elongated non-composite members are coupled to the primary longitudinal composite tube with respective first and second bonding sheets.

5. The agricultural vehicle of claim 1, wherein the boom arm segment includes a truss system, and wherein the primary longitudinal composite tube is a lower cord of the truss system.

6. The agricultural vehicle of claim 1, wherein each of the first and second elongated non-composite members includes a metal extrusion.

7. The agricultural vehicle of claim 1, wherein each of the first and second elongated non-composite members defines a curved profile that matches a curved profile of the elliptical cross-sectional shape of the outer perimeter of the primary longitudinal composite tube.

8. The agricultural vehicle of claim 1, wherein at least one of the first and second elongated non-composite members defines a hollow chamber extending along a length of the at least one of the first and second elongated non-composite members.

9. The agricultural vehicle of claim 1, wherein at least one of the first and second elongated non-composite members includes a mounting rail extending along a length of the at least one of the first and second elongated non-composite members.

10. The agricultural vehicle of claim 1, wherein the first elongated non-composite member has a different configuration or shape than the second elongated non-composite member.

* * * * *